United States Patent
Phan et al.

(10) Patent No.: US 12,177,589 B2
(45) Date of Patent: Dec. 24, 2024

(54) HIGH K METAL-INSULATOR-METAL (MIM) CAPACITOR NETWORK FOR LAG MITIGATION

(71) Applicant: OMNIVISION TECHNOLOGIES, INC., Santa Clara, CA (US)

(72) Inventors: Bill Phan, Sunnyvale, CA (US); Duli Mao, Sunnyvale, CA (US); Yuanliang Liu, San Jose, CA (US); Heesoo Kang, Cupertino, CA (US); Yifei Du, San Jose, CA (US); Woon Il Choi, Sunnyvale, CA (US)

(73) Assignee: OMNIVISION TECHNOLOGIES, INC.OMNIVISION TECHNOLOGIES, INC., Santa Clara, CA (US)

( * ) Notice: Subject to any disclaimer, the term of this patent is extended or adjusted under 35 U.S.C. 154(b) by 88 days.

(21) Appl. No.: 18/154,770

(22) Filed: Jan. 13, 2023

(65) Prior Publication Data
US 2024/0244350 A1    Jul. 18, 2024

(51) Int. Cl.
*H04N 25/77* (2023.01)
*H04N 25/59* (2023.01)

(52) U.S. Cl.
CPC .......... *H04N 25/77* (2023.01); *H04N 25/59* (2023.01)

(58) Field of Classification Search
CPC .................. H04N 25/50–59; H04N 25/77
See application file for complete search history.

(56) References Cited

U.S. PATENT DOCUMENTS

| | | | |
|---|---|---|---|
| 10,044,960 B2 | 8/2018 | Mao et al. | |
| 10,063,797 B2 | 8/2018 | Vampola et al. | |
| 11,330,207 B1 | 5/2022 | Dierickx | |
| 2004/0041077 A1 | 3/2004 | Fossum | |
| 2017/0347047 A1* | 11/2017 | Mao | H01L 27/14641 |
| 2018/0234652 A1 | 8/2018 | Sugawa et al. | |
| 2021/0168312 A1 | 6/2021 | Madurawe et al. | |
| 2021/0183926 A1 | 6/2021 | Choi et al. | |
| 2022/0053152 A1 | 2/2022 | Ikuma et al. | |
| 2023/0164460 A1 | 5/2023 | Park et al. | |
| 2023/0353898 A1 | 11/2023 | Tatsuta et al. | |
| 2023/0361164 A1* | 11/2023 | Tsai | H01L 29/66181 |

OTHER PUBLICATIONS

U.S. Appl. No. 17/808,896, filed Jun. 24, 2022, Choi et al.
(Continued)

*Primary Examiner* — Lin Ye
*Assistant Examiner* — Chriss S Yoder, III
(74) *Attorney, Agent, or Firm* — PERKINS COIE LLP

(57) ABSTRACT

A pixel circuit includes a photodiode configured to photo-generate image charge in response to incident light. A floating diffusion is coupled to receive the image charge from the photodiode. A transfer transistor is coupled between the photodiode and the floating diffusion. The transfer transistor is configured to transfer the image charge from the photodiode to the floating diffusion. A reset transistor is coupled between a reset voltage and the floating diffusion. A plurality of capacitor-switch pairs is coupled between the reset transistor and a bias voltage source. Each of the plurality of capacitor-switch pairs includes a lateral overflow integration capacitor (LOFIC) and a switch transistor coupled to the LOFIC.

20 Claims, 14 Drawing Sheets

(56) References Cited

OTHER PUBLICATIONS

U.S. Appl. No. 17/808,899, filed Jun. 24, 2022, Choi et al.
U.S. Appl. No. 17/849,325, filed Jun. 24, 2022, Choi et al.
U.S. Appl. No. 17/849,354, filed Jun. 24, 2022, Choi et al.
U.S. Appl. No. 17/849,403, filed Jun. 24, 2022, Gao et al.
Notice of Allowance; U.S. Appl. No. 18/154,715; Applicant: Omnivision Technologies, Inc.; mailed Jul. 5, 2024; 14 pages.

* cited by examiner

HIGH K METAL-INSULATOR-METAL (MIM) CAPACITOR NETWORK FOR LAG MITIGATION

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and photogenerate image charge upon absorption of the image light. The image charge photogenerated by the pixels may be measured as analog output image signals on column bitlines that vary as a function of the incident image light. In other words, the amount of image charge photogenerated is proportional to the intensity of the image light, which are read out as analog signals from the column bitlines and converted to digital values to produce digital images (i.e., image data) that represent the external scene.

Standard image sensors have a limited dynamic range of approximately 60 to 70 dB. However, the luminance dynamic range of the real world is much larger. For instance, natural scenes often span a range of 90 dB and greater. In order to capture details in bright highlights and dim shadows simultaneously, high dynamic range (HDR) technologies have been used in image sensors to increase the captured dynamic range.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
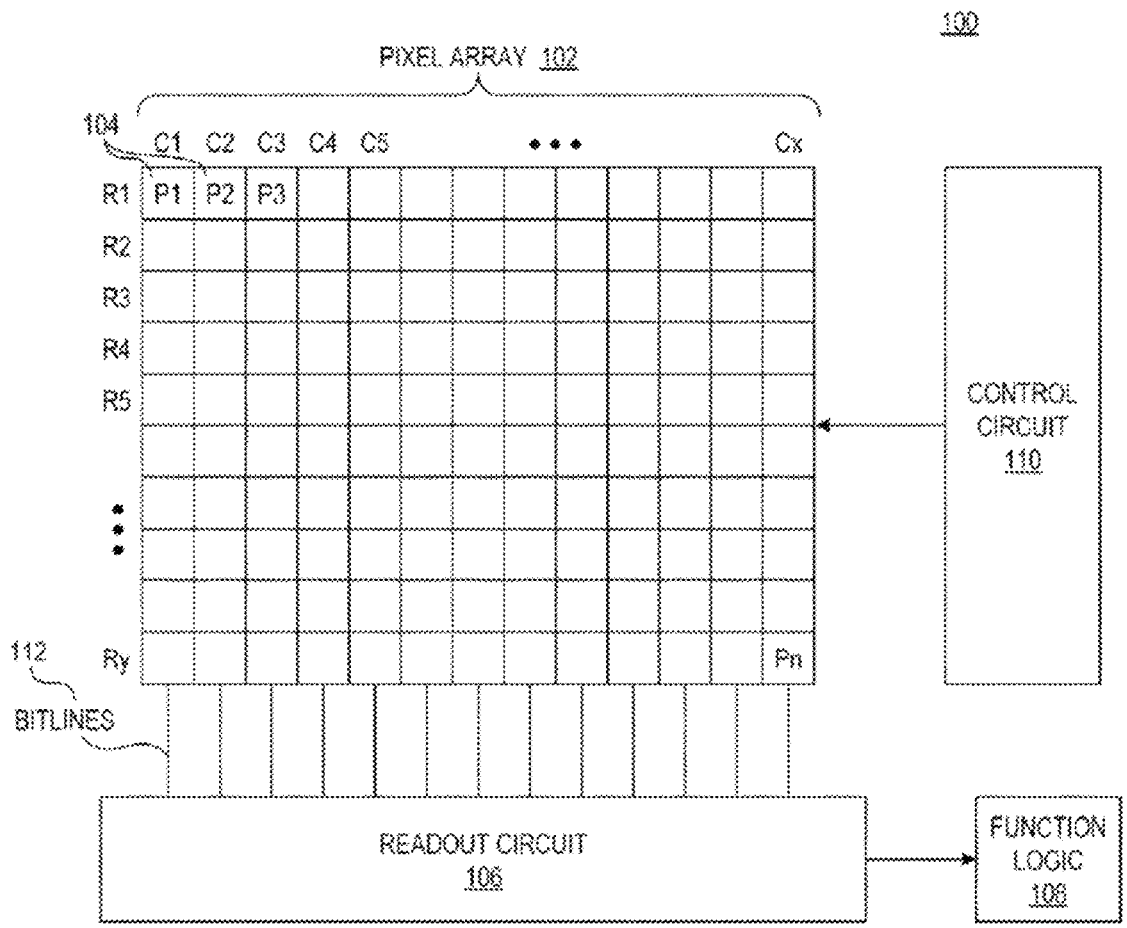
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with a pixel array including pixel circuits, each with a LOFIC network providing reduced image lag, are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top." "bottom," "left." "right." "center," "middle," and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with pixel circuits, each with a LOFIC network configured to provide reduced image lag, are disclosed. It is appreciated that LOFICs may be included in pixel circuits to increase the full well capacity of the pixel circuits and thereby increase high dynamic range capabilities of corresponding image sensors. LOFIC capacitance is positively correlated with full well capacity. Thus, as the capacitance of a LOFIC employed in a pixel circuit increases, the full well capacity of the pixel circuit also increases. For this reason, higher LOFIC capacitance is commonly desired. However, due to the huge RC loading as the capacitance of a LOFIC increases, the time required for row drivers of the imaging system to charge and/or reset the LOFIC also increases. Consequently, as the capacitances of LOFICs in pixel circuits increase, image lag increases, which causes slower frame rates.

It is appreciated that the image lag caused by LOFICs can be associated with the high dielectric constant or high-k material included in the insulation material of metal-insulator-metal (MIM) LOFICs due to the hysteresis characteristics and slow relaxation behavior of high-k materials that requires long discharge time (e.g., hundreds of milliseconds). The high-k material relaxation behavior can cause the degraded image quality such as image lag due to many mechanisms including trap-to-trap tunneling, structural relaxation, coupling with phonon energy, etc.

As will be shown in the various examples below, an example pixel circuit includes a photodiode configured to photogenerate image charge in response to incident light. A floating diffusion is coupled to receive the image charge from the photodiode. In one example, a reset transistor is coupled between a bias voltage source and the floating diffusion. In another example, the reset transistor is coupled between a reset voltage source and the floating diffusion. The reset transistor is configured to be switched in response to a reset control signal.

In the various examples, the pixel circuit also includes a LOFIC network providing additional storage capacity configured to store overflow image charge for high dynamic range (HDR) image acquisition. In various examples, the LOFIC network includes two or more capacitor-switch pairs, each including a LOFIC and a switch transistor. In various examples, each of the capacitor-switch are coupled to one another in parallel. In the various examples, each of the LOFICs is a metal-insulator-metal (MIM) storage capacitor that includes a high-k insulating region disposed between a first metal electrode and a second metal electrode. In the various examples, the first metal electrode of each of the LOFICs is coupled to a bias voltage source and the second metal electrode of each of the LOFICs is coupled to the switch transistor of the corresponding capacitor-switch pair, which is coupled to the reset transistor locally through one or more circuit elements of the pixel circuit including the floating diffusion of the pixel circuit. In various examples, the LOFIC may be disposed in a location separated from an anti-blooming path from the photodiode of the pixel circuit such that there is no charging stress across the LOFICs during an idle period.

Image lag is caused by the slow discharge of residual charges in LOFICs, which may cause a pixel circuit to be unable to keep up with the desired image sensor frame rate. If the residual charges from a prior frame(s) are not sufficiently discharged, they show up in the next frame, resulting in undesirable image lag. A LOFIC network in accordance with the teachings of the present disclosure is able to sufficiently discharge residual charges in the LOFICs by alternatingly coupling them to the rest of the pixel circuit on a frame-by-frame basis. In one example, in each frame period of the image sensor, only a single switch of the capacitor-switch pairs of the LOFIC network is on. As the image sensor moves on to the next frame, the previously on switch transistor is turned off and a different switch transistor is turned on. In other words, in one example, the multiple switch transistors alternate being on, with only one of the switch transistors on in a given frame, so that the LOFICs coupled to the switch transistors that are off can discharge residual charges prior to the frame in which their corresponding switch transistors would be turned on. Accordingly, a LOFIC storing charges from its active frame period has plenty of idle period to fully relax and sufficiently discharge before the integration period in its next active frame. The number of capacitor-switch pairs may depend on the frame rate desired and how much time a LOFIC needs to sufficiently discharge (e.g., more than 10 ms, more than 100 ms). For example, if a LOFIC takes 30 ms to sufficiently discharge and a frame rate of 30 frames per second (fps) is desired (each frame lasts about 33 ms), the LOFIC network should have at least two capacitor-switch pairs. As another example, if a LOFIC takes 30 ms to sufficiently discharge and a frame rate of 60 frames per second (fps) is desired (each frame lasts about 17 ms), the LOFIC network should have at least three capacitor-switch pairs.

To illustrate, FIG. 1 shows one example of an imaging system 100 having a pixel array with pixel circuits each including a LOFIC network providing reduced image lag in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a twodimensional (2D) array including a plurality of pixel circuits 104 (e.g., P1, P2, . . . . Pn) that are arranged into rows (e.g., R1 to Ry) and columns (e.g., C1 to Cx) to acquire image data of a person, place, object, etc., which can then be used to render an image of a person, place, object, etc.

In various examples, each pixel circuit 104 may include one or more photodiodes configured to photogenerate image charge in response to incident light. The image charge generated in the one or more photodiodes is transferred to a floating diffusion included in each pixel circuit 104, which may be converted to an image signal, which is then read out from each pixel circuit 104 by readout circuit 106 through column bitlines 112. As will be discussed, in the various examples, pixel circuits 104 are also be configured to provide HDR image signals, in which case, the image charge generated by the one or more photodiodes in bright lighting conditions may also be transferred to the LOFIC network and/or an additional floating diffusion in each pixel circuit 104 to store the image charge. For example, each pixel circuit 104 may include a LOFIC network configured to store one or more excess image charges that overflow from the coupled one or more photodiodes during an integration period. In the various examples, readout circuit 106 may be configured to read out the image signals through column bitlines 112. In various examples, readout circuit 106 may include current sources, routing circuitry, and comparators that may be included in analog to digital converters or otherwise.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
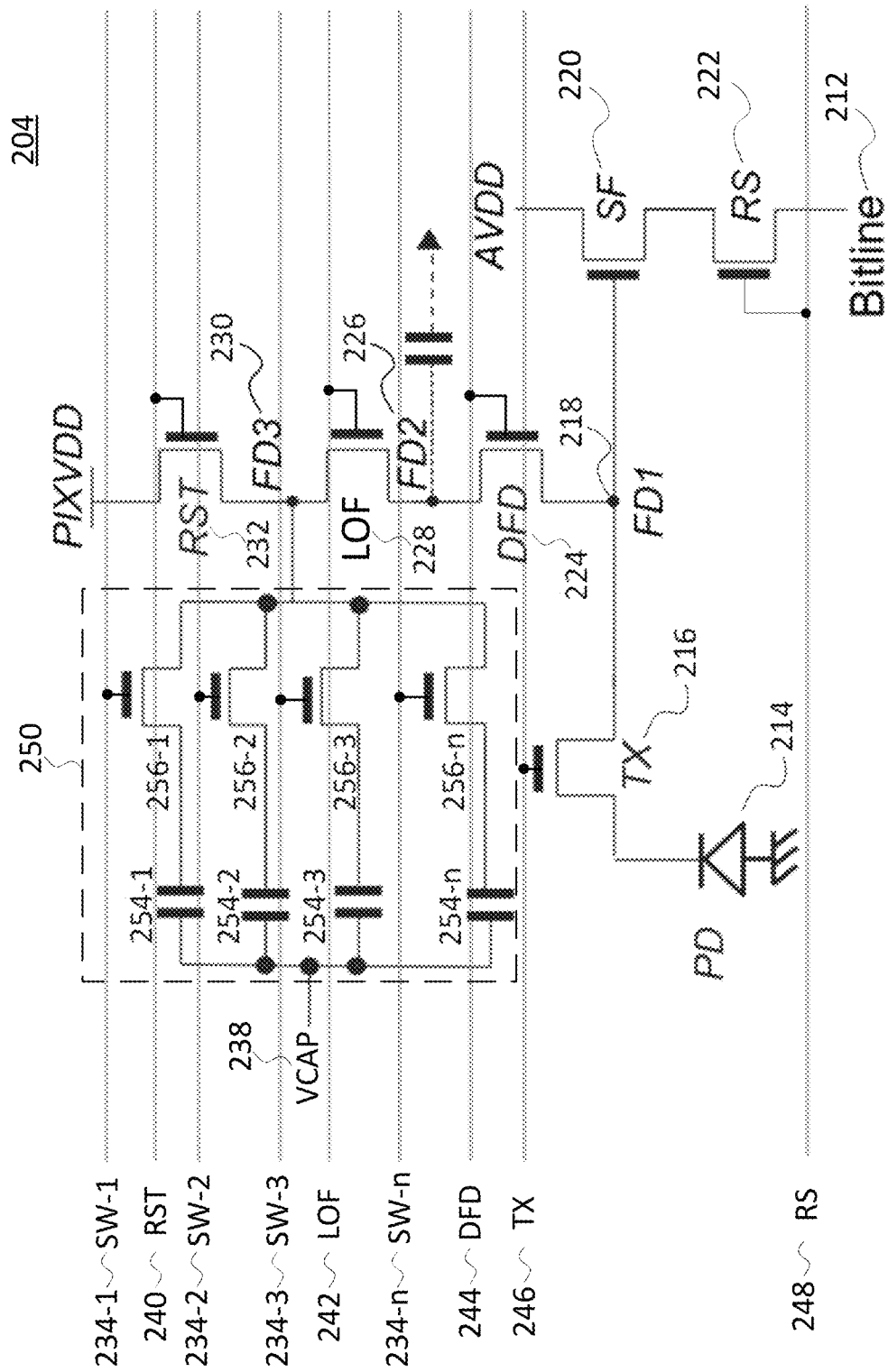
FIG. 2 illustrates a schematic of one example of a pixel circuit including a lateral overflow integration capacitor (LOFIC) network and a photodiode in accordance with the teachings of the present disclosure.

FIG. 2 illustrates a schematic of one example of a pixel circuit including a LOFIC network and a photodiode in accordance with the teachings of the present disclosure. It is appreciated that the pixel circuit 204 of FIG. 2 may be an example of one of the pixel circuits 104 included in pixel array 102 as shown in FIG. 1, and that similarly named and numbered elements described above are coupled and function similarly below.

As shown in the depicted example, pixel circuit 204 includes a photodiode 214, which is configured to photogenerate image charge in response to incident light. In the depicted example, pixel circuit 204 also includes a first floating diffusion FD1 218 coupled to receive the image charge from the photodiode 214 through a transfer transistor 216. In the example, the transfer transistor 216 is coupled to be controlled in response to a transfer control signal TX 246 to transfer image charge from the photodiode 214 to the first floating diffusion FD1 218, for example, during a readout period associated with the pixel circuit 204. A source follower transistor 220 has a gate coupled to the first floating diffusion FD1 218, and a row select transistor 222 is coupled to the source follower transistor 220 such that the source follower transistor 220 and the row select transistor 222 are coupled between a power line AVDD and a bitline 212 to output an image signal from the pixel circuit 204 in response to a row select control signal RS 248 and the amount of charge at the gate of the source follower transistor 220.

In the example illustrated in FIG. 2, a dual floating diffusion transistor 224 is coupled between the first floating diffusion FD1 218 and a second floating diffusion FD2 226. The second floating diffusion FD2 226 is coupled to a capacitor configured to receive excess image charge overflow from photodiode 214 through transfer transistor 216 and the dual floating diffusion transistor 224. The second floating diffusion FD2 226 is further coupled to a source of a LOFIC transistor 228. A third floating diffusion FD3 230 is coupled between the LOFIC transistor 228 and the reset transistor 232. A drain of reset transistor 232 is coupled to reset voltage source PIXVDD and a source of the reset transistor 232 is coupled to the third floating diffusion FD3 230. The dual floating diffusion transistor 224 is coupled to be controlled in response to a dual floating diffusion control signal DFD 244, the LOFIC transistor 228 is coupled to be controlled in response to a LOFIC transistor control signal LOF 242, and the reset transistor 232 is coupled to be controlled in response to a reset control signal RST 240.

As shown in the depicted example, pixel circuit 204 also includes a LOFIC network 250 coupled between a bias voltage source VCAP 238 and the third floating diffusion FD3 230. Therefore, it is appreciated that the LOFIC network 250 is selectively coupled to the first floating diffusion FD1 218 through the LOFIC transistor 228 and the dual floating diffusion transistor 224. The LOFIC network 250 is configured to receive excess image charge overflow from the photodiode 214 (e.g., under a bright light condition, such as IR or LED light).

In the example, the LOFIC network 250 includes two or more capacitor-switch pairs coupled in parallel. Each capacitor-switch pair includes a respective LOFIC 254-n and a switch transistor 256-n. The switch transistor 256-n is coupled to the respective LOFIC 254-n in series between bias voltage source VCAP 238 and the third floating diffusion FD3 230. The switch transistors are coupled to be controlled in response to switch control signals SW-1 . . . SW-n 234-1 . . . 234-n. As will be discussed in the various examples, the inactive LOFICs 254-1 . . . 254-n in LOFIC network 250 are given enough time to relax and sufficiently discharge residual charges such that the remaining charge will not have an impact on a next captured frame during operation by alternatingly coupling and decoupling the LOFICs 254-1 . . . 254-n from the rest of the pixel circuit on a frame-by-frame basis via the switch transistors 256-1 . . . 256-n. For example, in each frame period of the image sensor, only a single switch (e.g., 256-1) of the capacitor-switch pairs of the LOFIC network 250 is on. As the image sensor moves on to the next frame, a different switch transistor (e.g., 256-2) is turned on and all other switch transistors, including the one that was on during the previous frame (e.g., 256-1, 256-3 . . . 256-n), are turned off. The LOFICs 254-1 . . . 254-n coupled to the respective switch transistors 256-1 . . . 256-n that are off can discharge residual charges prior to the frame in which their corresponding switch transistors would be turned on. Accordingly, a LOFIC 254-*n* storing charges from its active frame period has plenty of idle period to fully relax and sufficiently discharge before the integration period in its next active frame, reducing any undesirable image lag (e.g., visible artifacts on the captured frame).

In the various example, the number of capacitor-switch pairs may depend on the frame rate desired and how much time a LOFIC needs to sufficiently discharge (e.g., more than 10 ms, more than 100 ms). For example, if a LOFIC takes 30 ms to sufficiently discharge and a frame rate of 30 frames per second (fps) is desired (each frame lasts about 33 ms), the LOFIC network should have at least two capacitor-switch pairs. As another example, if a LOFIC takes 30 ms to sufficiently discharge and a frame rate of 60 frames per second (fps) is desired (each frame lasts about 17 ms), the LOFIC network should have at least three capacitor-switch pairs. Having more capacitor-switch pairs can increase the reduction in image lag but should be balanced against the greater size of a semiconductor substrate necessary to accommodate all elements of the pixel circuit 204.

In the example, the LOFIC 254-*n* is implemented with a metal-insulator-metal (MIM) capacitor including a high dielectric or high-k insulating material disposed between a first metal electrode and a second metal electrode. In various examples, the insulating material disposed between the first metal electrode and the second metal electrode of the LOFIC 254-*n* may be formed of a single layer of high-k material or a multiple layer stack of high-k material. The exact composition and an overall thickness of high-k material may depend on the desired LOFIC capacitance. In the various examples, high-k material may include one of aluminum oxide ($AhO_3$), Zirconium dioxide ($ZrO_2$), Hafnium oxide (HfO), or a combination thereof. The LOFICs 254-1 . . . 254-*n* may have substantially the same dimensions, dielectric composition, and/or dielectric thickness.

In operation, the bias voltage source VCAP 238 is configured to provide a bias voltage to the LOFIC network 250 during precharge and readout periods. In one example, the bias voltage source VCAP 238 may have a value between 0V and 3.5V. It is appreciated that in the various examples, the voltage level of the bias voltage source VCAP 238 may be determined in consideration of the stable range of the high-k material. In the example, during the idle period, the reset control signal RST 240 may have a value sufficient to turn on the reset transistor 232 (e.g., between 2.5V and 4V), the dual floating diffusion control signal DFD 244 may have a high voltage value ranging between 2.5 V and 4V, the LOFIC transistor control signal LOF 242 may have a value of 0V to 4V, and the transfer control signal TX 246 may have a value of 0V to 3V.

Figure 3A:
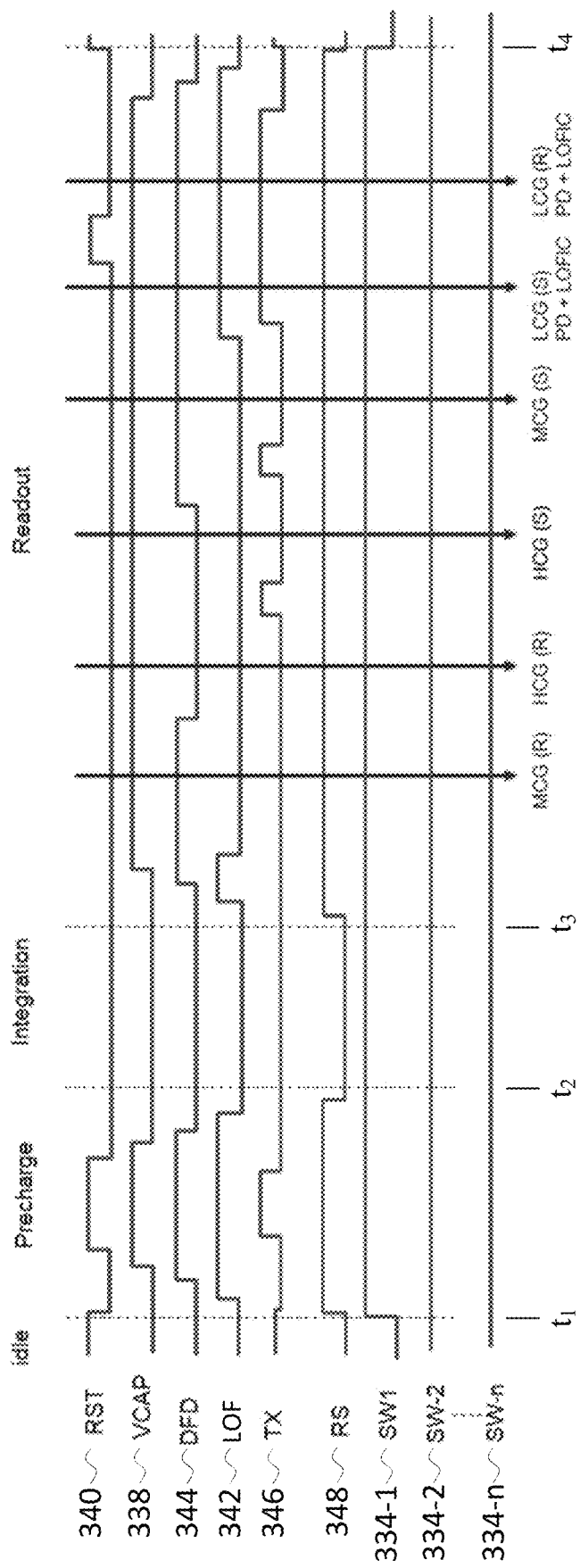
FIGS. 3A, 3B, and 3C illustrate timing diagrams of different frame periods of example signal values in an example pixel circuit including a LOFIC network and a photodiode during idle, precharge, integration, and readout periods in accordance with the teachings of the present disclosure.
Figure 3B:
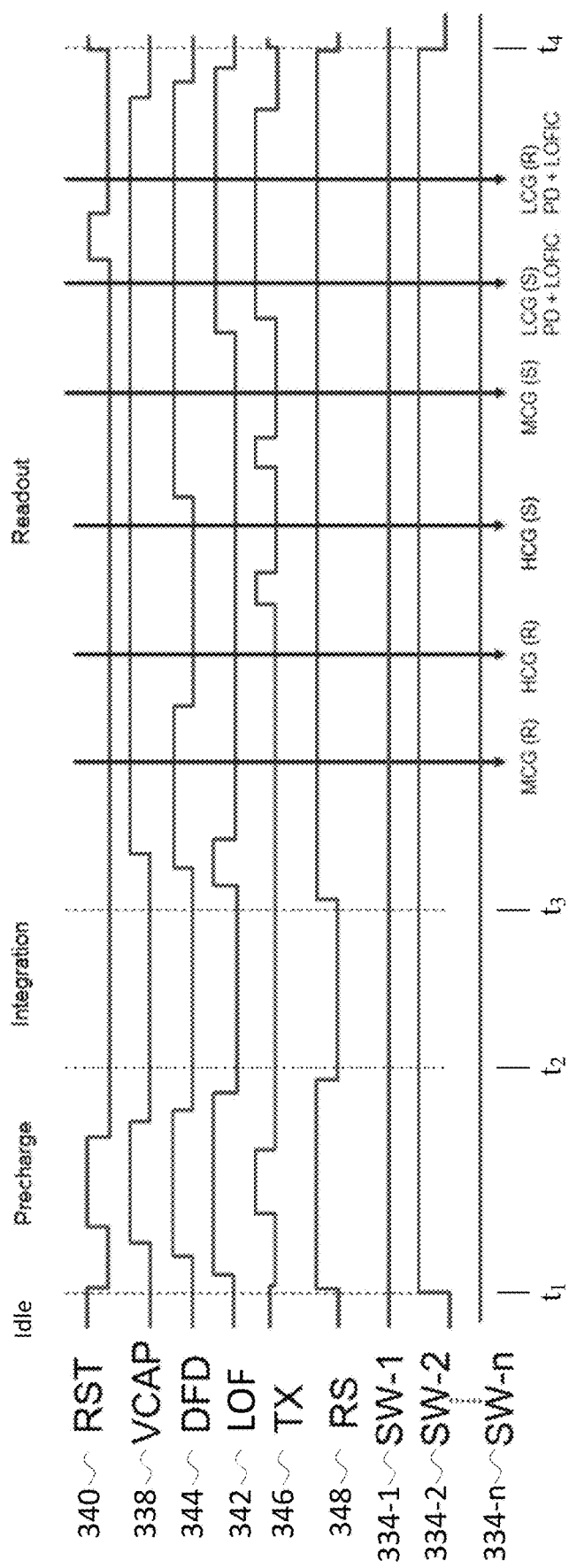
Figure 3C:
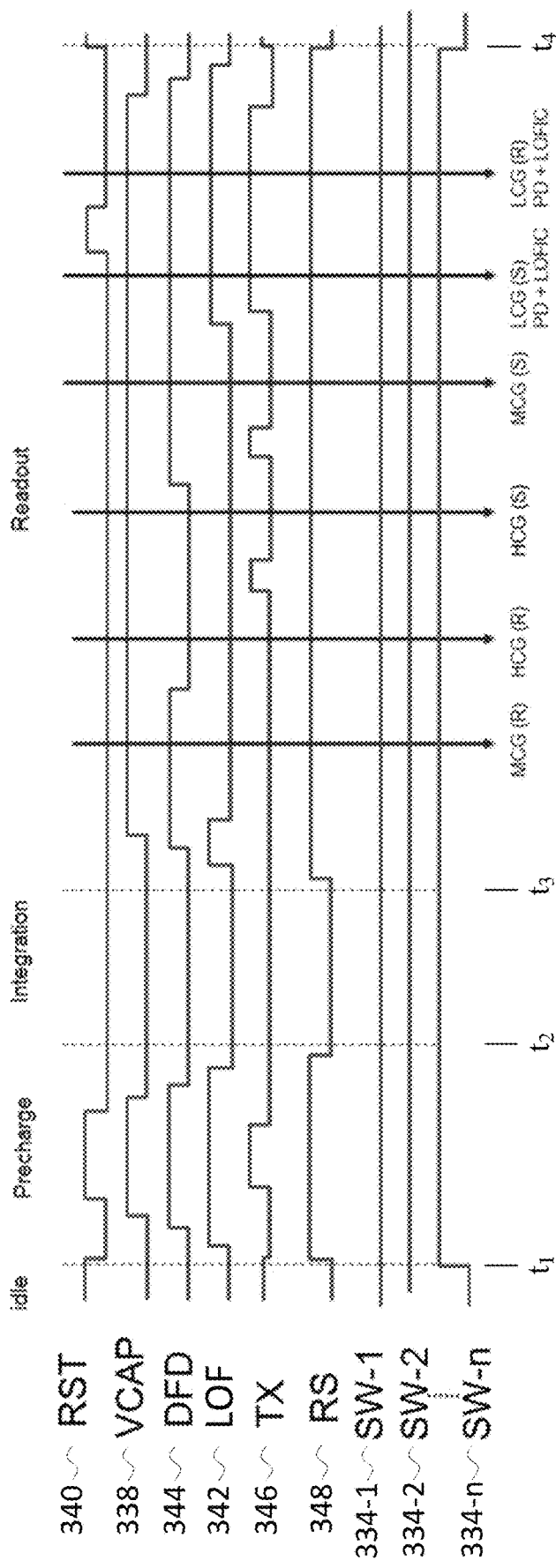

FIGS. 3A, 3B, and 3C illustrate timing diagrams of a first, a second, and an n-th frame period, respectively, of example signal values in an example pixel circuit including a LOFIC network and a photodiode. Each frame (i.e., each of FIGS. 3A, 3B, and 3C) operates in idle, precharge, integration, and readout periods in accordance with the teachings of the present disclosure. It is appreciated that the signals depicted in FIGS. 3A, 3B, and 3C may be examples of the signals depicted in FIG. 2 for controlling the operation of the example pixel circuit such as pixel circuit 204, and that similarly named and numbered elements described above are coupled and function similarly below.

Referring now to the depicted examples, FIGS. 3A, 3B, and 3C illustrate a reset control signal RST 340, a bias voltage VCAP 338, a dual floating diffusion control signal DFD 344, a LOFIC control signal LOF 342, a transfer control signal TX 346, a row select control signal RS 348, a first switch control signal SW-1 334-1, a second switch control signal SW-2 334-2, and an n-th switch control signal SW-n 334-*n*, which are configured to control the respective circuit elements discussed in detail above in FIG. 2.

As shown during the idle period of each frame depicted in FIGS. 3A, 3B, and 3C, the reset control signal RST 340 turns on the reset transistor 232. The bias voltage VCAP 338, the dual floating diffusion control signal DFD 344, the LOFIC control signal LOF 342, the transfer control signal TX 346, the row select control signal RS 348, the first switch control signal SW-1 334-1, the second switch control signal SW-2 334-2, and the n-th switch control signal SW-n 334-*n* are all configured to have low values (e.g., 0 volts) during the idle period. In various examples, the LOFIC network 250 shortens the idle period because residual charges in the LOFICs can be discharged during one or more entire frame periods instead of just the idle period.

At time $t_1$, the idle period ends with the reset control signal RST 340 falling back down to a low value (e.g., 0 volts), and the precharge period begins. For each frame, one of the switch control signals SW-1 . . . SW-n 334-1 . . . 334-*n* turns on the corresponding switch transistor 256-1 . . . 256-*n* (e.g., in FIG. 3A, the first switch control signal SW-1 334-1 is turned on) while the remaining switch control signals SW-1 . . . SW-n 334-1 . . . 334-*n* are simultaneously turned off (e.g., in FIG. 3A, the second through n-th switch control signals SW-2 . . . SW-n 334-2 . . . 334-*n* are turned off). Next, the row select control signal RS 348 turns on the row select transistor 222. Then, the LOFIC control signal LOF 342 turns on the LOFIC transistor 228, and then the dual floating diffusion control signal DFD 344 turns on the dual floating diffusion transistor 224, and then the bias voltage source VCAP 338 is turned on, and then the reset control signal RST 340 turns on the reset transistor 232, and then the transfer control signal TX 346 turns on the transfer transistor 216. At this time during the precharge period, the photodiode 214, the first, second, and third floating diffusions FD1-3 218, 226, 230 are all reset through the reset transistor 232. The control signals are then switched to a low value (e.g., 0 volts) in the reverse order, such that the transfer control signal TX 346 turns off the transfer transistor 216 first and the row select control signal RS 348 turns off the row select transistor 222 last. However, the switch control signal SW-n 334-*n* that was turned on at time $t_1$ remains on until the end of the readout period of the frame period, as depicted in FIGS. 3A, 3B, and 3C.

At time $t_2$, the precharge period ends and the integration period begins. All of the control signals are low except the switch control signal SW-n coupled to the active LOFIC 254-*n* and corresponding to the frame, which remains on as aforementioned. During integration, the photodiode 214 photogenerates image charge in response to incident light. The pixel circuit 204 is configured such that excess photo-generated charges may overflow from the photodiode 214 to the LOFIC network 250 through the dual floating diffusion transistor 224 and the LOFIC transistor 228 for storage under strong or bright light conditions (e.g., LED light or IR light).

In one example, during the integration period, excess image charge photogenerated is configured to overflow from the photodiode 214 to the second floating diffusion FD2 226 through the dual floating diffusion transistor 224 and to the LOFIC network 250 through the dual floating diffusion transistor 224 and the LOFIC transistor 228.

At time $t_3$, the integration period ends and the readout period begins. The row select control signal RS 348 turns on the row select transistor 222, then the LOFIC control signal LOF 342 pulses the LOFIC transistor 228, and then the dual floating diffusion control signal DFD 344 turns on the dual floating diffusion transistor 224, and then the bias voltage source VCAP 338 is turned on or coupled to apply the bias voltage to the LOFIC network 250 for charge readout.

Next, a correlated double sampling (CDS) readout of the photodiode 214 occurs during which time a medium conversion gain (MCG) readout of a reset value (R) from the photodiode 214 occurs. Next, the dual floating diffusion control signal DFD 344 turns off the dual floating diffusion transistor 224, and then a high conversion gain (HCG) readout of a reset value (R) from the photodiode 214 occurs. Next, the transfer control signal TX 346 pulses the transfer transistor 216, and then a HCG readout of a signal value (S) occurs based on charges transferred to the first floating diffusion FD1 218. Next, the dual floating diffusion control signal DFD 344 turns on the dual floating diffusion transistor 224, and then the transfer control signal TX 346 pulses the transfer transistor 216 again, after which a MCG readout of a signal value (S) occurs based on charges in the first floating diffusion FD1 218 and the second floating diffusion FD2 218.

Next, the LOFIC control signal LOF 342 turns on the LOFIC transistor 228, and then the transfer control signal TX 346 turns on the transfer transistor 216. Next, a LOFIC readout of the photodiode 214 occurs during which time a low conversion gain (LCG) readout of a signal value (S) occurs based on charges in the first floating diffusion FD1 218, the second floating diffusion FD2 218, and respective LOFIC 254-$n$. Next, the reset control signal RST 340 pulses the reset transistor 232, and then a LCG readout of a reset value (R) of the photodiode 214 occurs. In the various examples, a CDS MCG readout may be determined by finding the difference between the MCG signal value (S) and the MCG reset value (R), a CDS HCG readout may be determined by finding the difference between the HCG signal value (S) and the HCG reset value (R), and a CDS LCG readout may be determined by finding the difference between the LCG signal value (S) and the LCG reset value (R).

Afterwards, the reset control signal RST 340 turns on the reset transistor 232 at $t_4$ and all other signals, including the switch control signal SW-n 334-$n$ that was turned on at time $t_1$, turn off their corresponding transistors. At time $t_4$, the readout period ends and the idle period begins again for the next frame. As illustrated in FIGS. 3A, 3B, and 3C, the difference between frames is which switch control signal SW-n 334-$n$ is turned on. If there are two capacitor-switch pairs in the LOFIC network 250, the timing diagrams would alternate between FIGS. 3A and 3B. If there are five capacitor-switch pairs in the LOFIC network 250, the timing diagrams would return to FIG. 3A for the sixth frame.

Figure 4:
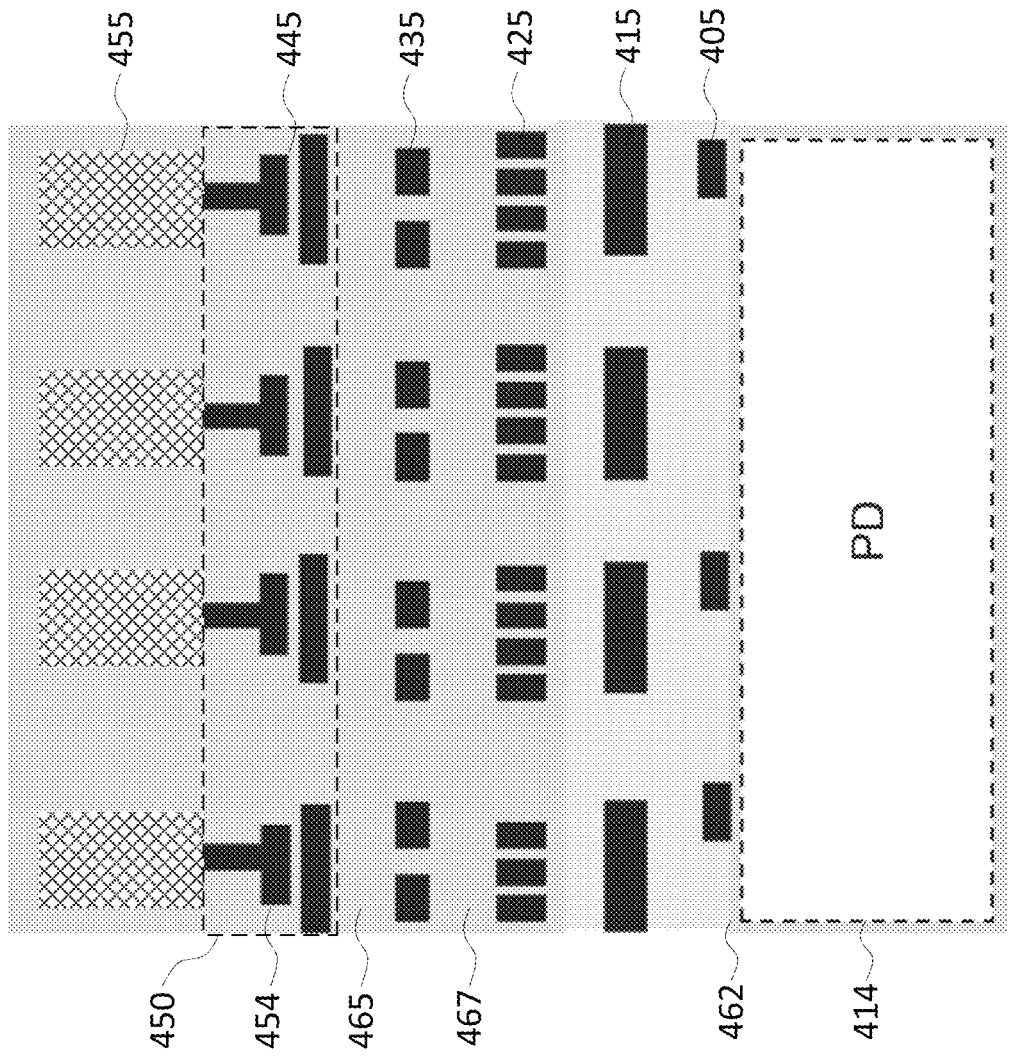
FIG. 4 illustrates a cross-section of a pixel circuit including a LOFIC network on a substrate and a photodiode in accordance with the teachings of the present disclosure.

FIG. 4 illustrates a cross-section of one example of a pixel circuit 404 including a LOFIC network 450 on a substrate 462 and a photodiode 414 in accordance with the teachings of the present disclosure. It is appreciated that the pixel circuit 404 of FIG. 4 may be an example of one of the pixel circuits 104 included in pixel array 102 as shown in FIG. 1 or the pixel circuit 204 illustrated in FIG. 2, and that similarly named and numbered elements described above are coupled and function similarly below. As shown in the depicted example, above the photodiode 414 and the substrate 462 are a gate layer 405 and a plurality of metal layers including a first metal layer 415, a second metal layer 425, a third metal layer 435, a fourth metal layer 445, and a fifth metal layer 455. In the depicted example, the LOFICs of the LOFIC network 450, each included a plurality of LOFICs 454, are disposed in the fourth metal layer 445. In some examples, the LOFIC network 450 may be disposed within an allocated pixel region of the pixel circuit 404.

In the example depicted in FIG. 4, the pixel circuit 404 may include two different inter-layer materials: an inter-metal dielectric (IMD) 465 and an inter-layer dielectric (ILD) 467. In various examples, the IMD and ILD have different dielectric constants. Typically, the IMD is used for copper interconnects and includes high-k material film (e.g., hafnium oxide), whereas the ILD is used for encapsulating transistor gates and includes oxide material film with a lower dielectric constant.

Figure 5:
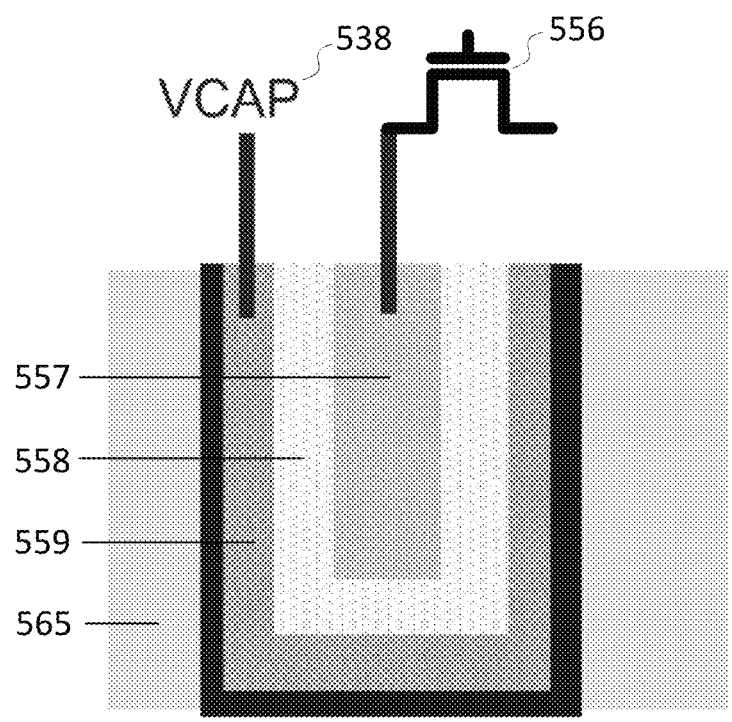
FIG. 5 illustrates a cross-section of a LOFIC on a substrate in accordance with the teachings of the present disclosure.

FIG. 5 illustrates a cross-section of showing increased detail of one example of a LOFIC 554 in an inter-metal dielectric (IMD) 565 in accordance with the teachings of the present disclosure. It is appreciated that the LOFIC 554 of FIG. 5 may be an example of one of the LOFICs 254-$n$ and switch transistor 556 may be an example of one of the switch transistors 256-$n$ included in pixel circuit 204 as shown in FIG. 2 or one of the LOFICs 454 included in LOFIC network 450 of FIG. 4, and that similarly named and numbered elements described above are coupled and function similarly below. In the depicted example, the LOFIC 554 is disposed in the IMD 565 proximate to a semiconductor substrate (e.g., substrate 462 in FIG. 4). The LOFIC 554 includes a capacitor bottom metal (CBM) electrode 557, a high-k insulating material 558, and a capacitor top metal (CTM) electrode 559. In the illustrated example, the CTM electrode 559 surrounds the insulating material 558 and the CBM electrode 557 in the center of the LOFIC 554. However, in other embodiments, the CTM and CBM electrodes 559 and 557 may be arranged according to conventional capacitor structures, such as having parallel plates. The CTM electrode 559 is coupled to the bias voltage source VCAP 538, and the CBM electrode 557 is coupled to the corresponding switch transistor 556 that is further coupled to a floating diffusion node (e.g., third floating diffusion FD3 230 of FIG. 2) or a source of a reset transistor (e.g., reset transistor 230 of FIG. 2). The LOFIC 554 is insulated from other circuit elements using the IMD layer 565, as illustrated in FIG. 4. Each LOFIC 554 may have substantially the same dimensions, dielectric composition, and/or dielectric thickness.

Figure 6:
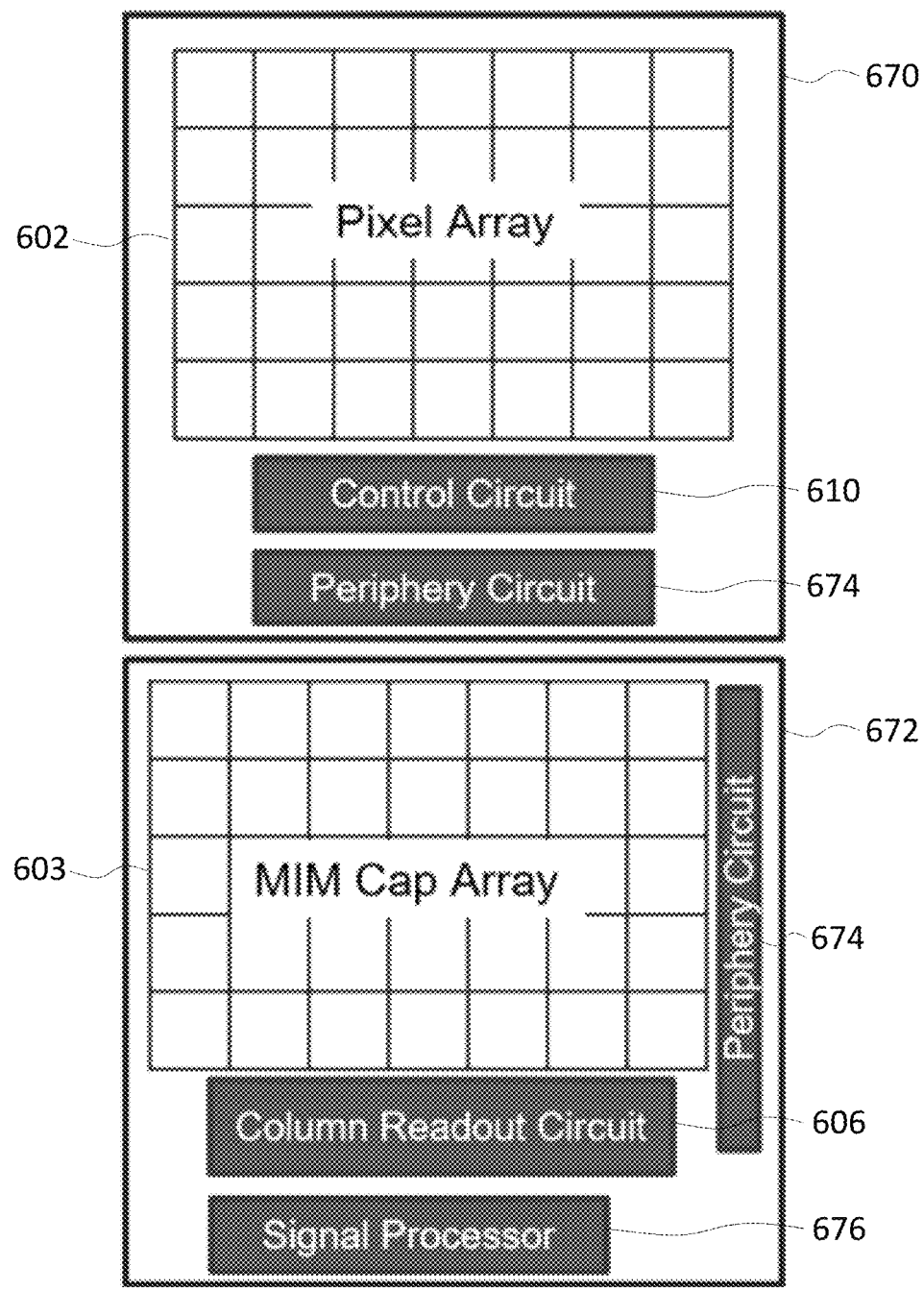
FIG. 6 illustrates a first wafer including a pixel array stacked with a second wafer including a LOFIC network array in accordance with the teachings of the present disclosure.

FIG. 6 illustrates an imaging system 600 with a first wafer 670 stacked with and coupled to a second wafer 672 in accordance with the teachings of the present disclosure. It is appreciated that the imaging system 600 of FIG. 6 may be an example of the imaging system 100 as shown in FIG. 1, and that similarly named and numbered elements described above are coupled and function similarly below. The first and second wafers 670 and 672 may be semiconductor wafers and may be stacked and interconnected by bonding (e.g., hybrid bonding, oxide bonding) or one or more through substrate vias (TSVs). The second wafer 672 may be an application-specific integrated circuit (ASIC) wafer. The first wafer 670 includes a pixel array 602, a control circuit 610, and a periphery circuit 674. The second wafer 672 includes a MIM cap (e.g., LOFIC) array 603, a column readout circuit 606, and signal processor 676, and the periphery circuit 674. In some embodiments, the associated switch transistors may also be included on the second wafer 672. The periphery circuit 674 may include one or more filter circuits to reduce noise, such as an array of decoupling capacitors. Arranging the imaging system 600 on two separate wafers allows for LOFIC network expansion and layout flexibility.

Figure 7:
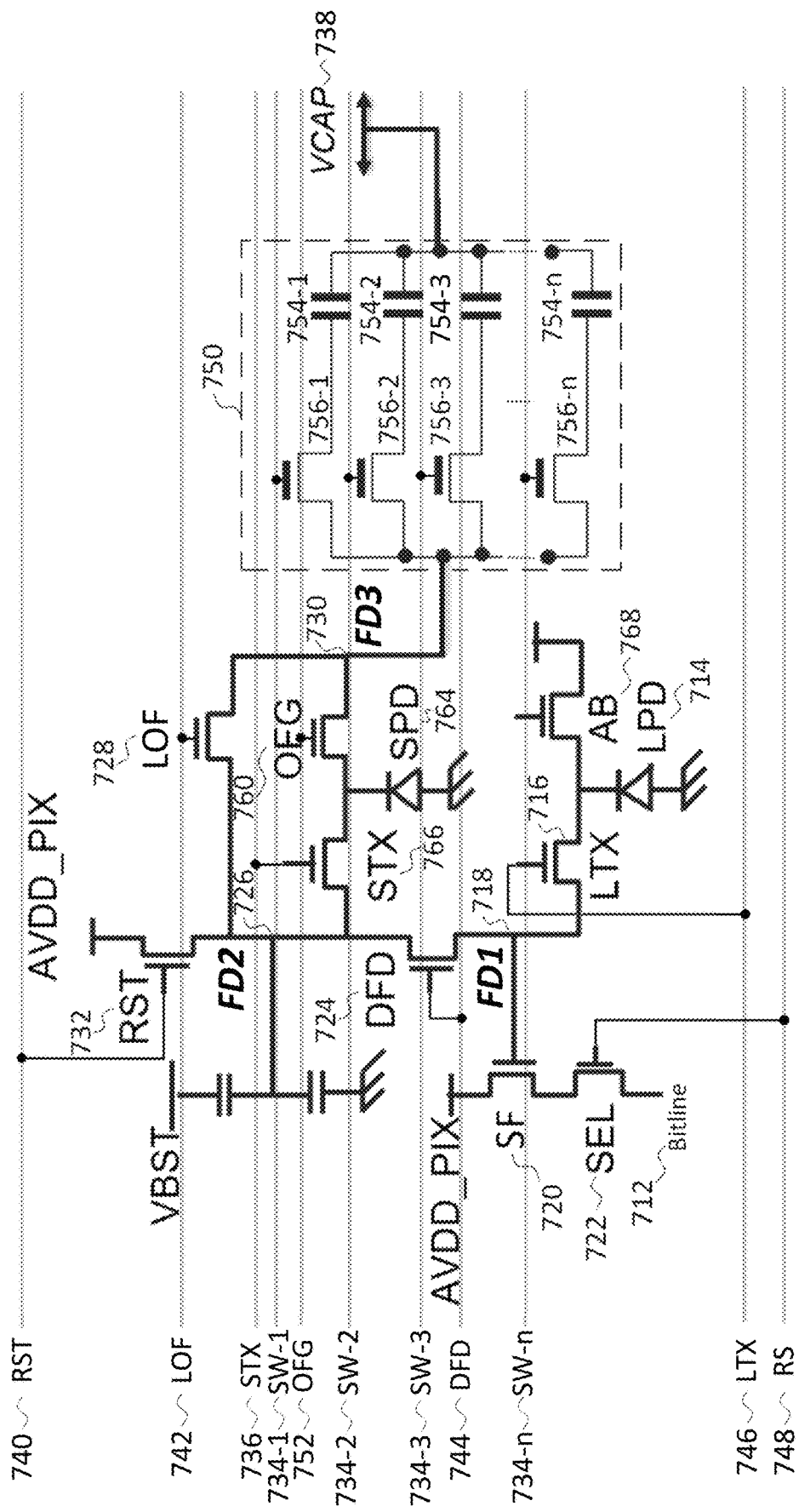
FIG. 7 illustrates a schematic of one example of a pixel circuit including a lateral overflow integration capacitor (LOFIC) network and two photodiodes in accordance with the teachings of the present disclosure.

FIG. 7 illustrates a schematic of one example of a pixel circuit 704 including a lateral overflow integration capacitor (LOFIC) network 750 and a plurality of photodiodes including photodiodes 714 and 764 in accordance with the teachings of the present disclosure. It is appreciated that the pixel circuit 704 of FIG. 7 may be an example of one of the pixel circuits 104 included in pixel array 102 as shown in FIG. 1, and that similarly named and numbered elements described above are coupled and function similarly below.

As shown in the depicted example, pixel circuit 704 includes a first photodiode 714 (e.g., a large photodiode LPD), which is configured to photogenerate image charge in response to incident light. In the depicted example, pixel circuit 704 includes an anti-blooming transistor 768 coupled to the first photodiode 714. Pixel circuit 704 also includes a first floating diffusion FD1 718 coupled to receive the image charge from the first photodiode 714 through a first transfer transistor 716 (e.g., a transfer transistor for large photodiode LPD). In the example, the first transfer transistor 716 is coupled to be controlled in response to a first transfer control signal LTX 746 (e.g., a transfer control signal LTX associated with large photodiode LPD) to transfer image charge from the first photodiode 714 to the first floating diffusion FD1 718, for example, during a readout period associated with the pixel circuit 704. A source follower transistor 720 has a gate coupled to the first floating diffusion FD1 718, and a row select transistor 722 is coupled to the source follower transistor 720 such that the source follower transistor 720 and the row select transistor 722 are coupled between a power line AVDD_PIX and a bitline 712 to output an image signal from the pixel circuit 704 in response to a row select control signal RS 748 and the amount of charge at the gate of the source follower transistor 720.

In the example illustrated in FIG. 7, a dual floating diffusion transistor 724 is coupled between the first floating diffusion FD1 718 and a second floating diffusion FD2 726. In one example, the second floating diffusion FD2 726 may be coupled to one or more capacitors configured to receive excess image charge overflow from the first photodiode 714 through the first transfer transistor 716 and the dual floating diffusion transistor 724. In one example, a reset transistor 732 is coupled between a reset voltage source AVDD_PIX and the second floating diffusion FD2 726. The second floating diffusion FD2 726 is further coupled to a LOFIC transistor 728, which is coupled between the second floating diffusion FD2 726 and a third floating diffusion FD3 730. The third floating diffusion FD3 730 is coupled between the LOFIC transistor 728 and a LOFIC network 750. The dual floating diffusion transistor 724 is coupled to be controlled in response to a dual floating diffusion control signal DFD 744, the LOFIC transistor 728 is coupled to be controlled in response to a LOFIC transistor control signal LOF 742, and the reset transistor 732 is coupled to be controlled in response to a reset control signal RST 740.

Pixel circuit 704 further includes a second photodiode 764 (e.g., a small photodiode SPD), which is configured to photogenerate image charge in response to incident light. A second transfer transistor 766 (e.g., a transfer transistor for small photodiode SPD) is coupled to be controlled in response to a second transfer control signal STX 736 (e.g., a transfer control signal associated with small photodiode SPD) to transfer image charge from the second photodiode 764 to the second floating diffusion FD2 726, for example, during a readout period associated with the pixel circuit 704.

The first photodiode 714 and the second photodiode 764 may have different light sensing characteristics, such as different full well capacities or different light sensitivity to realize high dynamic imaging. For example, the first photodiode 714 may have greater sensitivity than the second photodiode 764. In some embodiments, the first photodiode 714 is configured to sense low light and the second photodiode 764 is configured to sense bright light. In some embodiments, the first photodiode 714 may have a photo-sensing area larger than a photo-sensing area of the second photodiode 764.

As shown in the depicted example, pixel circuit 704 also includes the LOFIC network 750 coupled between a bias voltage source VCAP 738 and the third floating diffusion FD3 730. Therefore, it is appreciated that the LOFIC network 750 is selectively coupled to the first floating diffusion FD1 718 through the LOFIC transistor 728 and the dual floating diffusion transistor 724. The LOFIC network 750 is configured to receive excess image charge (e.g., under a bright light condition, such as IR or LED light) through an overflow gate transistor 760. The overflow gate transistor 760 is coupled to be controlled in response to an overflow gate control signal OFG 752 to transfer overflow image charges from the second photodiode 764 to the LOFIC network 750.

In the example, the LOFIC network 750 includes two or more capacitor-switch pairs coupled in parallel. Each capacitor-switch pair includes a respective LOFIC 754-*n* and a switch transistor 756-*n*. The switch transistor 756-*n* is connected to the respective LOFIC 754-*n* in series in between bias voltage source VCAP 738 and the third floating diffusion FD3 730. The switch transistors are coupled to be controlled in response to switch control signals SW-1 . . . SW-n 734-1 . . . 734-*n* for controlling operation of respective LOFIC 754-*n*. The LOFIC network 750 is able to sufficiently discharge residual charges in the LOFICs 754-1 . . . 754-*n* by alternately coupling them to the rest of the pixel circuit on a frame-by-frame basis via the switch transistors 756-1 . . . 756-*n*. In one example, in each frame period of the image sensor, only a single switch transistor (e.g., 756-1) of the capacitor-switch pairs of the LOFIC network 750 is on at a time while all other switch transistors (e.g., 756-2 . . . 756-*n*) are simultaneously turned off. As the image sensor moves on to the next frame, a different switch transistor (e.g., 756-2) is turned on and all other switch transistors, including the one that was on during the previous frame (e.g., 756-1, 756-3 . . . 756-*n*), are simultaneously turned off. The LOFICs 754-1 . . . 754-*n* coupled to the switch transistors 756-1 . . . 756-*n* that are off such that the inactive LOFICs (e.g., 754-1 . . . 754-*n*) in LOFIC network 750 are given enough time to relax and sufficiently discharge residual charges prior to the frame in which their corresponding switch transistors would be turned on. Accordingly, a LOFIC 754-*n* storing charges from its active frame period has plenty of idle period to fully relax and sufficiently discharge before the integration period in its next active frame, reducing any undesirable image lag (e.g., visible artifacts on the captured frame).

In the various examples, the number of capacitor-switch pairs may depend on the frame rate desired and how much time a LOFIC needs to sufficiently discharge (e.g., more than 10 ms, more than 100 ms). For example, if a LOFIC takes 30 ms to sufficiently discharge and a frame rate of 30 frames per second (fps) is desired (each frame lasts about 33 ms), the LOFIC network 750 should have at least two capacitor-switch pairs. As another example, if a LOFIC takes 30 ms to sufficiently discharge and a frame rate of 60 frames per second (fps) is desired (each frame lasts about 17 ms), the LOFIC network 750 should have at least three capacitor-switch pairs. Having more capacitor-switch pairs can increase the reduction in image lag but should be balanced against the greater size of a semiconductor substrate necessary to accommodate all elements of the pixel circuit 704.

In the example, the LOFIC 754-n is implemented with a metal-insulator-metal (MIM) capacitor including a high dielectric or high-k insulating material disposed between a first metal electrode and a second metal electrode. In various examples, the insulating material disposed between the first metal electrode and the second metal electrode of the LOFIC 754-n may be formed of a single layer of high-k material or a multiple layer stack of high-k material. The exact composition and an overall thickness of high-k material may depend on the desired LOFIC capacitance. In the various examples, high-k material may include one of aluminum oxide ($AhO_3$), Zirconium dioxide ($ZrO_2$), Hafnium oxide (HfO), or a combination thereof. The LOFICs 754-1 . . . 754-n may have substantially the same dimensions, dielectric composition, and/or dielectric thickness.

In operation, the bias voltage source VCAP 738 is configured to provide a bias voltage to the LOFIC network 750 during precharge and readout periods. In one example, the bias voltage source VCAP 738 may have a value between 0V and 3.5V. It is appreciated that in the various examples, the voltage level of the bias voltage source VCAP 738 may be determined in consideration of the stable range of the high-k material. In the example, during the idle period, the reset control signal RST 740 may have a value sufficient to turn on the reset transistor 732 (e.g., between 2.5V and 4V), the dual floating diffusion control signal DFD 744 may have a high voltage value ranging between 2.5 V and 4V, the LOFIC transistor control signal LOF 742 may have a value of 0V to 4V. and the first and second transfer control signals LTX 746 and STX 736 may each have a value of 0V to 3V.

Figure 8A:
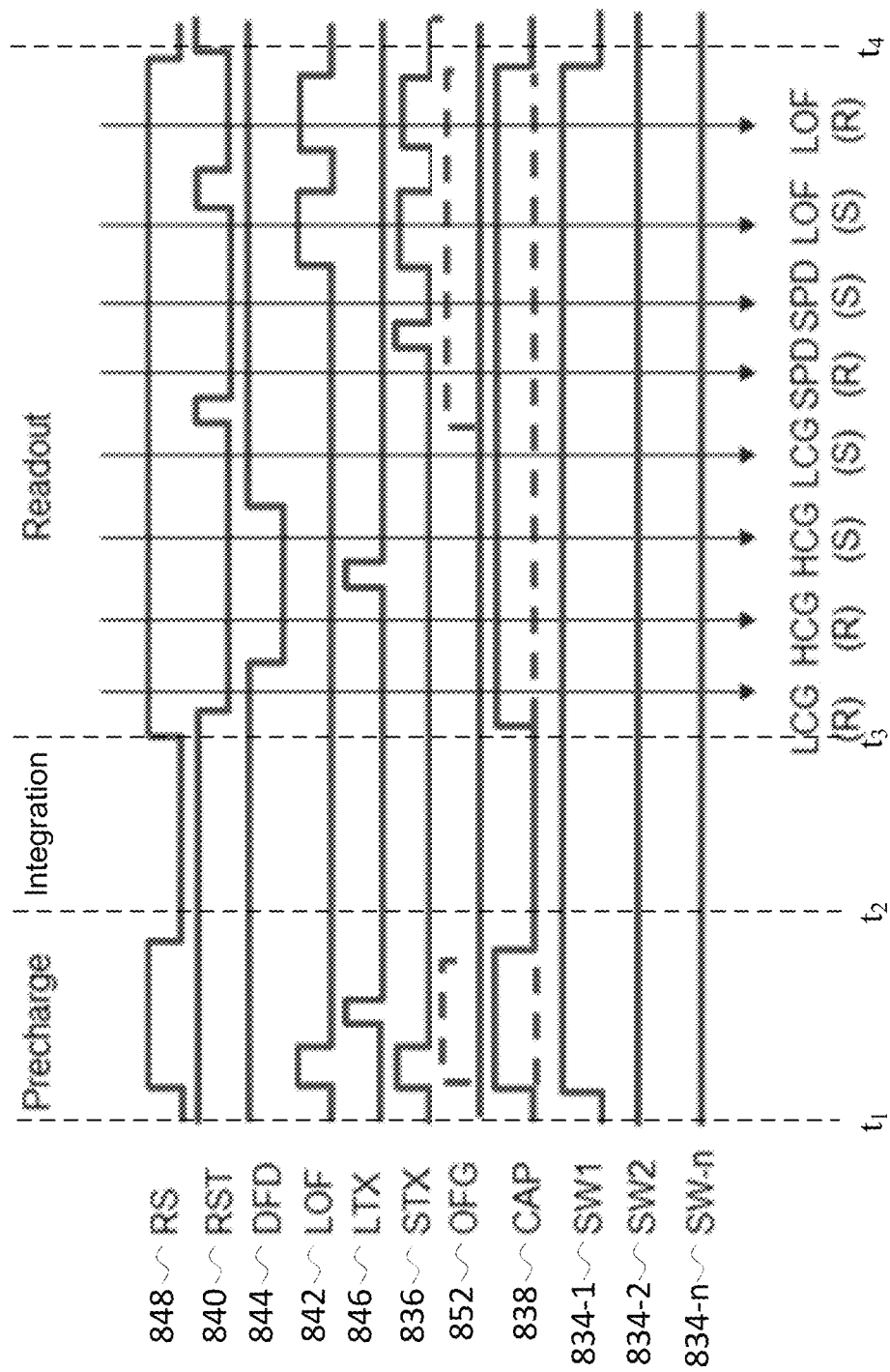
FIGS. 8A, 8B, and 8C illustrate timing diagrams of different frame periods of example signal values in an example pixel circuit including a LOFIC network and two photodiodes during precharge, integration, and readout periods in accordance with the teachings of the present disclosure.
Figure 8B:
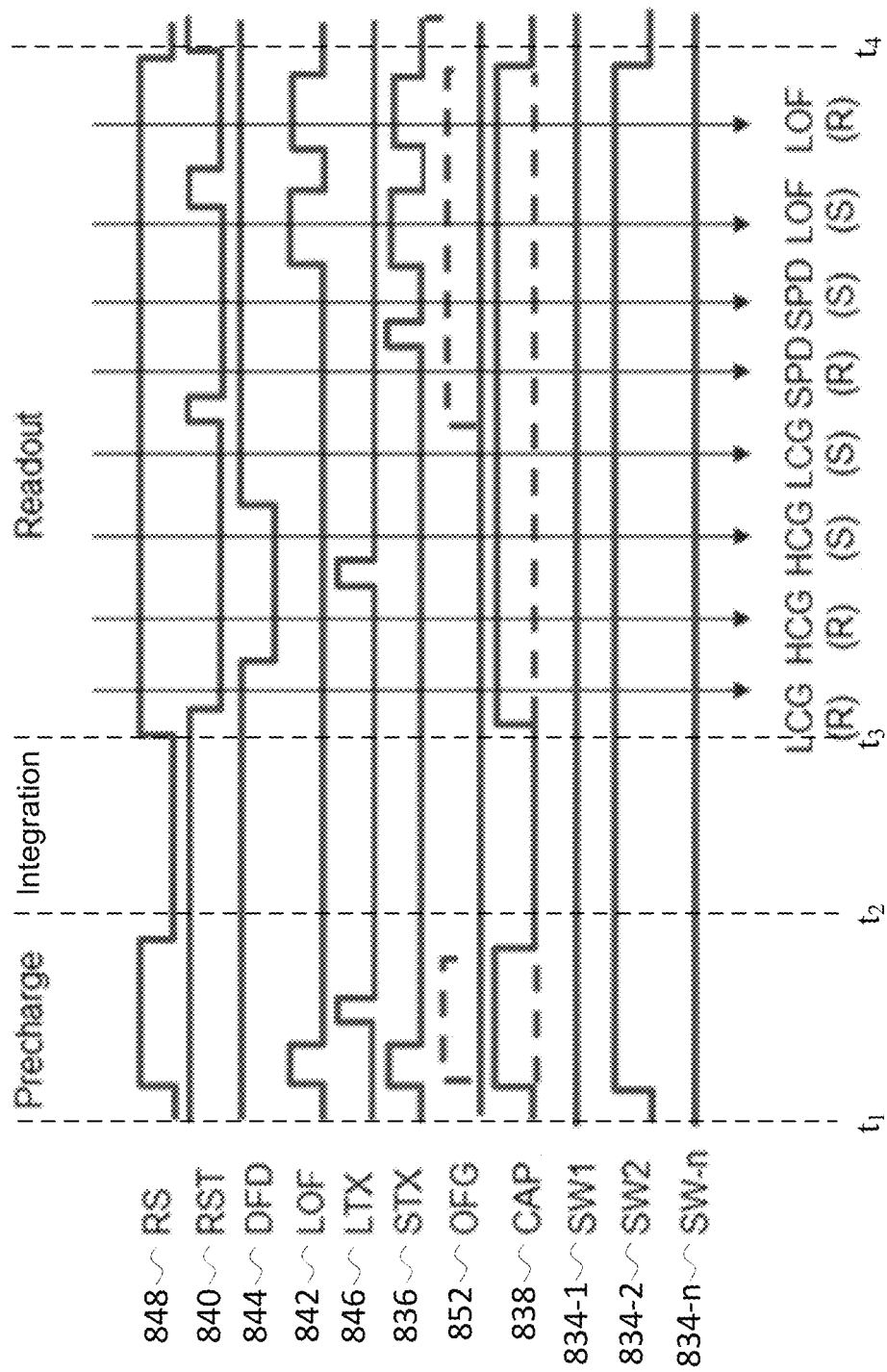
Figure 8C:
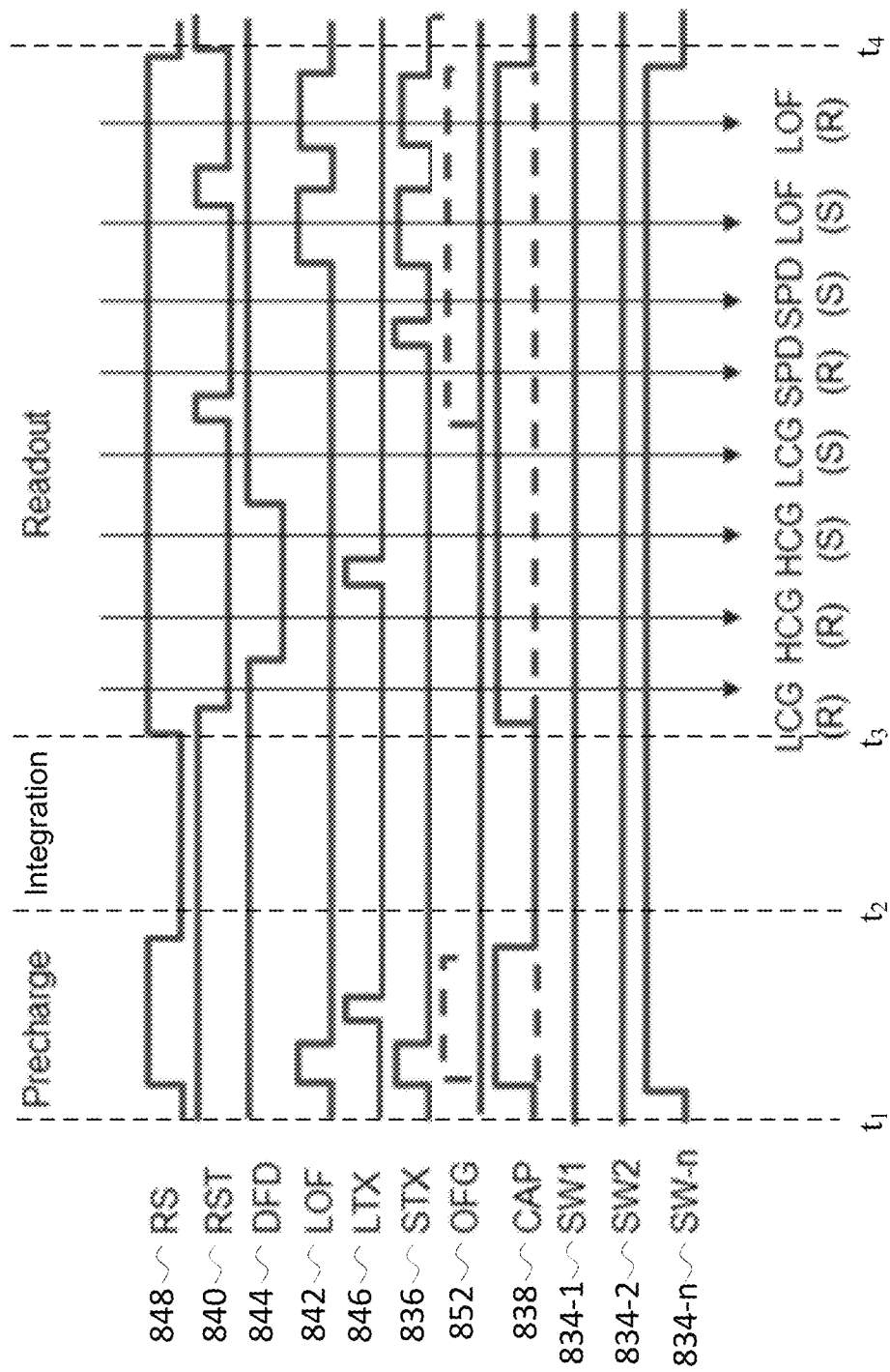

FIGS. 8A, 8B, and 8C illustrate timing diagrams a first, a second, and an n-th frame period, respectively, of example signal values in an example pixel circuit including a LOFIC network and two photodiodes. Each frame (i.e., each of FIGS. 8A, 8B, and 8C) operates in precharge, integration, and readout periods in accordance with the teachings of the present disclosure. It is appreciated that the signals depicted in FIGS. 8A, 8B, and 8C may be examples of the signals depicted in FIG. 7 for controlling the operation of the example pixel circuit such as pixel circuit 704, and that similarly named and numbered elements described above are coupled and function similarly below.

Referring now to the depicted examples, FIGS. 8A, 8B, and 8C illustrate a row select control signal RS 848, a reset control signal RST 840, a dual floating diffusion control signal DFD 844, a LOFIC control signal LOF 842, a first transfer control signal LTX 846, a second transfer control signal STX 836, an overflow gate control signal OFG 852, a bias voltage CAP 838, a first switch control signal SW-1 834-1, a second switch control signal SW-2 834-2, and an n-th switch control signal SW-n 834-n, which are configured to control the respective circuit elements discussed in detail above in FIG. 7.

At time $t_1$, the precharge period begins. The reset control signal RST 840 continues to turn on the reset transistor 732 and the dual floating diffusion control signal DFD 844 likewise continues to turn on the dual floating diffusion transistor 724 from the previous frame. For each frame, one of the switch control signals SW-1 . . . SW-n 834-1 . . . 834-n turns on the corresponding switch transistor 756-1 . . . 756-n (e.g., in FIG. 8A, the first switch control signal SW-1 834-1 is turned on) while the remaining switch control signals SW-1 . . . SW-n 834-1 . . . 834-n are simultaneously turned off (e.g., in FIG. 8A, the second through n-th switch control signals SW-2 . . . SW-n 834-2 . . . 834-n are turned off). The row select control signal RS 848 turns on the row select transistor 722 and the bias voltage source CAP 838 is turned on. The LOFIC control signal LOF 842 pulses the LOFIC transistor 728, the second transfer control signal STX 836 pulses the second transfer transistor 766, and the first transfer control signal LTX 846 pulses the transfer transistor 716. Near the end of the precharge period, row select control signal RS 848 turns off the row select transistor 722 and the bias voltage source CAP 838 is turned off or decoupled from the LOFIC network 750. At this time during the precharge period, the first and second photodiodes 714 and 764, the first, second, and third floating diffusions FD1-3 718, 726, 730 are all reset through the reset transistor 732. The switch control signal SW-n 834-n that was turned on at time $t_1$ remains on until the end of the readout period of the frame period, as depicted in FIGS. 8A, 8B, and 8C.

In other embodiments, during the precharge period, the bias voltage source CAP 838 may remain off and the overflow gate control signal OFG 825 may turn on and off the overflow gate transistor 760 instead, as illustrated by dotted lines in FIGS. 8A, 8B, and 8C. In one example, the overflow gate transistor 760 may be zero-biased to provide an overflow path between second photodiode 764 and the respective LOFIC 754-n through the corresponding switch transistor 756-n.

At time $t_2$, the precharge period ends and the integration (i.e., exposure) period begins. The signals turned on during this period are the reset control signal RST 840, the dual floating diffusion control signal DFD 844, and the switch control signal SW-n corresponding to the frame. During integration, the first and second photodiode 714 and 764 photogenerate image charge in response to incident light. The pixel circuit 704 is configured such that excess photogenerated charges may overflow from the second photodiode 764 to the LOFIC network 750 through the LOFIC transistor 728 for storage under strong or bright light conditions (e.g., LED light or IR light).

At time $t_3$, the integration period ends and the readout period begins. The row select control signal RS 848 turns on the row select transistor 722, the bias voltage source VCAP 838 is turned on or coupled to apply bias voltage to the LOFIC network 750 for charge readout, then the reset control signal RST 840 turns off the reset transistor 732.

Next, a correlated doubling sampling (CDS) readout of the first photodiode 714 occurs during which time a low conversion gain (LCG) readout of a reset value (R) from the first photodiode 714 occurs. Next, the dual floating diffusion control signal DFD 844 turns off the dual floating diffusion transistor 724, and then a high conversion gain (HCG) readout of a reset value (R) from the first photodiode 714 occurs. Next, the first transfer control signal LTX 846 pulses the first transfer transistor 716, and then a HCG readout of a signal value (S) occurs based on charges in the first photodiode 714 and the first floating diffusion FD1 718.

Next, the dual floating diffusion control signal DFD 844 turns on the dual floating diffusion transistor 724, after which a LCG readout of a signal value (S) occurs based on charges in the first photodiode 714, the first floating diffusion FD1 718, and the second floating diffusion 724.

Next, the reset control signal RST 840 pulses the reset transistor 732, and then a second photodiode (SPD) readout of a reset value (R) occurs. Next, the second transfer control signal STX 836 pulses the second transfer transistor 766, and a SPD readout of a signal value (S) occurs based on charges in the second photodiode 764, the first floating diffusion FD1 718, and the second floating diffusion 724.

Next, the LOFIC control signal LOF 842 turns on the LOFIC transistor 728, and then the second transfer control signal STX 836 turns on the second transfer transistor 766. Next, a LOFIC readout occurs during which time a lateral overflow (LOF) readout of a signal value (S) occurs based on charges in the second photodiode 764, the first floating diffusion FD1 718, the second floating diffusion 724, and respective LOFIC 754-*n*. Next, the reset control signal RST 840 pulses the reset transistor 732, the LOFIC control signal LOF 842 pulses the LOFIC transistor 728 off and back on, and the second transfer control signal STX 836 pulses the second transfer transistor 766 off and back on. Next, a LOF readout of a reset value (R) occurs. In the various examples, a CDS LCG readout may be determined by finding the difference between the LCG signal value (S) and the LCG reset value (R), a CDS HCG readout may be determined by finding the difference between the HCG signal value (S) and the HCG reset value (R), a CDS SPD readout may be determined by finding the difference between the SPD signal value (S) and the SPD reset value (R), and a CDS LOF readout may be determined by finding the difference between the LOF signal value (S) and the LOF reset value (R).

Afterwards, the reset control signal RST 840 turns on the reset transistor 732 at $t_4$ and all other signals, except for the dual floating diffusion control signal DFD 844, turn off their corresponding transistors. At time $t_4$, the readout period ends and the precharge period begins again for the next frame. As illustrated in FIGS. 8A, 8B, and 8C, the difference between frames is which switch control signal SW-n 834-*n* is turned on. If there are two capacitor-switch pairs in the LOFIC network 750, the timing diagrams would alternate between FIGS. 8A and 8B. If there are five capacitor-switch pairs in the LOFIC network 750, the timing diagrams would return to FIG. 8A for the sixth frame.

Figure 9:
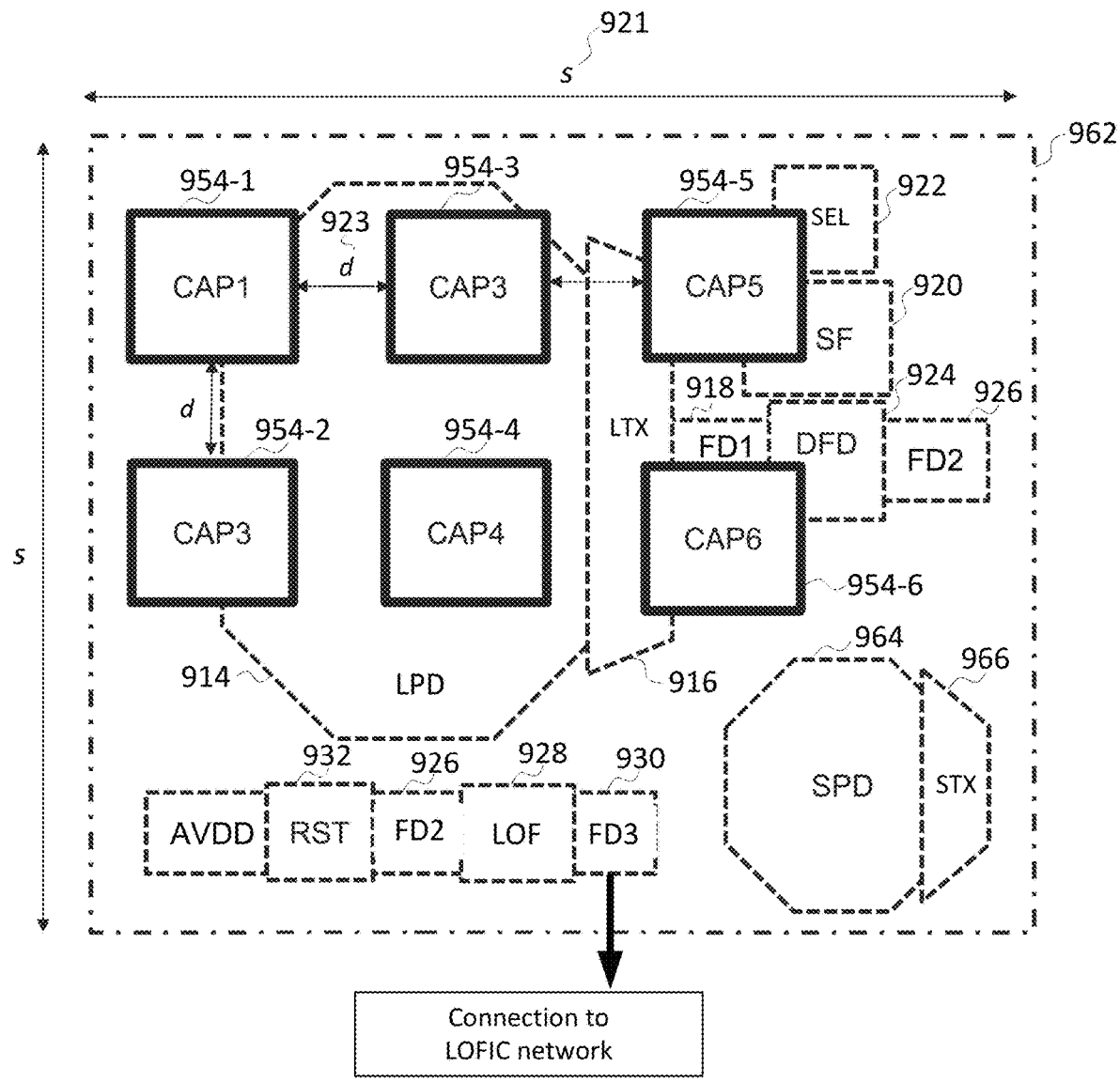
FIG. 9 illustrates a diagram showing a top-down view of a pixel circuit including a LOFIC network on a substrate and two photodiodes in accordance with the teachings of the present disclosure.

FIG. 9 illustrates a diagram showing a top-down view of one example of a pixel circuit 904 including a LOFIC network on a substrate and a plurality of photodiodes including two photodiodes in accordance with the teachings of the present disclosure. It is appreciated that the pixel circuit 904 of FIG. 9 may be an example of one of the pixel circuits 104 included in pixel array 102 as shown in FIG. 1, and/or the pixel circuit 704 as shown in FIG. 7, and that similarly named and numbered elements described above are coupled and function similarly below. As illustrated in the depicted example, the area occupied by pixel circuit 904 on substrate 962 is generally a square shape with a side length s 921. In various examples, the side length s 921 can be, for example, between 1 micrometer and 5 micrometers (e.g., 3 micrometers). In the illustrated embodiment, the substrate 962 can accommodate six capacitor-switch pairs 954-1 . . . 954-6. In the depicted example, the LOFICs are arranged in a 2×3 grid within the pixel area defined for pixel circuit 904 and each is separated by a distance d 923. In various examples, the distance d 923 can be determined based on the side length s 921 of the substrate 962 and the length of each LOFIC (e.g., 0.25 micrometers).

The other circuit elements shown in the example depicted in FIG. 9 are represented in dotted lines to show that they are on different layers on the substrate 962 than the LOFICs 954-1 . . . 954-6. These include the first photodiode 914, the first transfer transistor 916, the second photodiode 964, the second transfer transistor 966, the first floating diffusion FD1 918, the second floating diffusion FD2 926, the third floating diffusion FD3 930, the dual floating diffusion transistor 924, the source follower transistor 920, the row select transistor 922, the reset transistor 932, the LOFIC transistor 928, and the power line AVDD. In some embodiments, one or more of these elements may be omitted. In some embodiments, pixel circuit 904 may include additional elements not shown in FIG. 9. As illustrated in both FIG. 7 and FIG. 9, the third floating diffusion FD3 930 serves as the connection to the LOFIC network.

Figure 10:
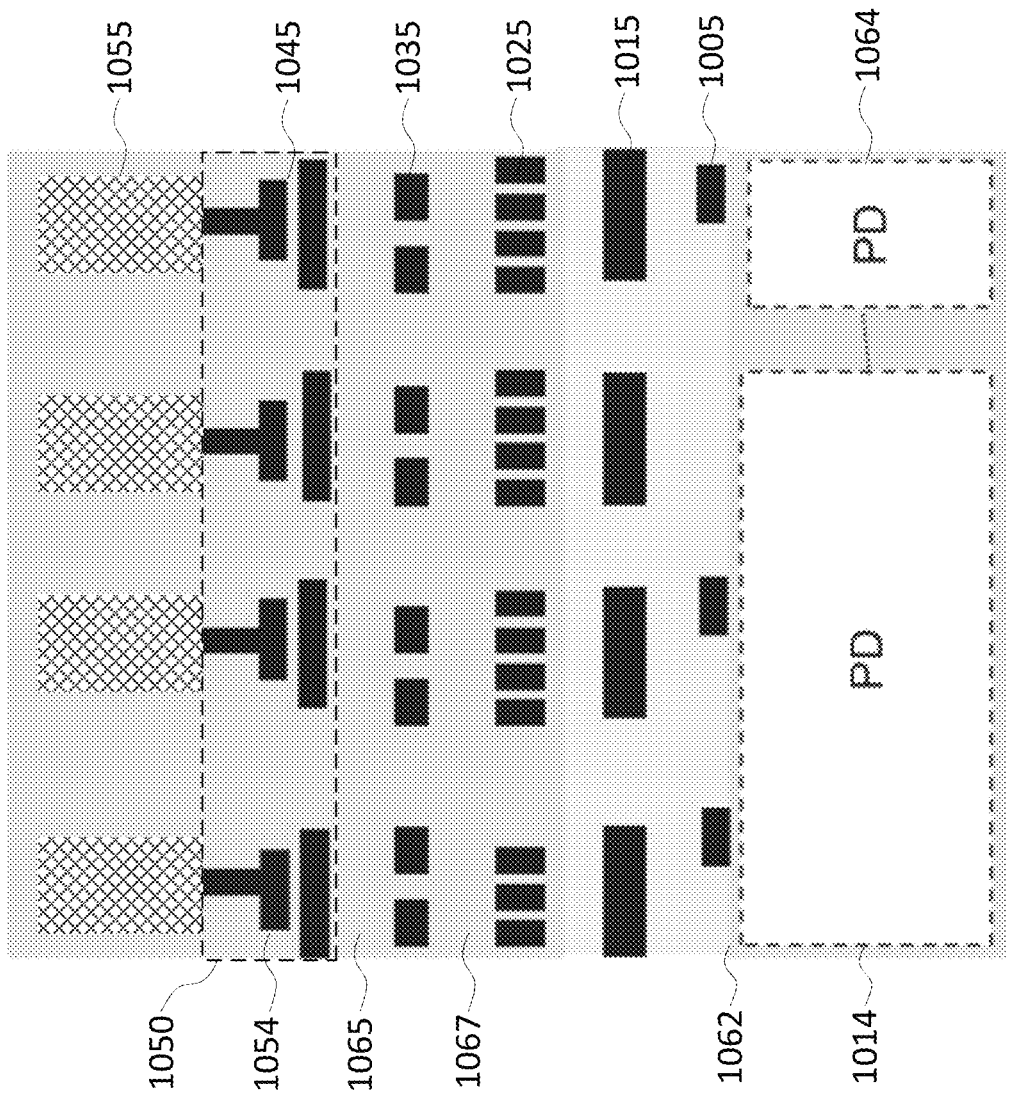
FIG. 10 illustrates a cross-section of a pixel circuit including a LOFIC network on a substrate and two photodiodes in accordance with the teachings of the present disclosure.

FIG. 10 illustrates a cross-section of one example of a pixel circuit 1004 including a LOFIC network 1050 on a substrate 1062 and a plurality of photodiodes including two photodiodes 1014 and 1064 in accordance with the teachings of the present disclosure. It is appreciated that the pixel circuit 1004 of FIG. 10 may be an example of one of the pixel circuits 104 included in pixel array 102 as shown in FIG. 1 or the pixel circuit 704 illustrated in FIG. 7, and that similarly named and numbered elements described above are coupled and function similarly below. As shown in the depicted example, above the first photodiode 1014 (e.g., large photodiode), the second photodiode 1064 (e.g., small photodiode), and the substrate 1062 are a gate layer 1005 and a plurality of metal layers including a first metal layer 1015, a second metal layer 1025, a third metal layer 1035, a fourth metal layer 1045, and a fifth metal layer 1055. In the depicted example, the LOFICs of the LOFIC network 1050, each including a plurality of LOFICs 1054, is disposed in the fourth metal layer 1045. In some embodiments, the LOFICs of the LOFIC network 1050 may only be arranged above and within the photodiode area (e.g., doped or implanted area) of the first photodiode 1014. In some embodiments, the LOFICs of the LOFIC network 1050 may be arranged above the photodiode area of the first photodiode 1014 and device transistor region associated with the pixel circuit 1004.

In the example depicted in FIG. 10, pixel circuit 1004 may include two different inter-layer materials: an inter-metal dielectric (IMD) 1065 and an inter-layer dielectric (ILD) 1067. In various examples, the IMD and ILD have different dielectric constants. Typically, the IMD is used for copper interconnects and includes high-k material film (e.g., hafnium oxide), whereas the ILD is used for encapsulating transistor gates and includes oxide material film with a lower dielectric constant.

The various embodiments of the LOFIC network described herein can be used with any imaging system that includes MIM capacitors (e.g., auto sensors). The LOFIC network disclosed helps solve lag issues associated with imaging systems.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A pixel circuit, comprising:
a photodiode configured to photogenerate image charge in response to incident light;
a floating diffusion coupled to receive the image charge from the photodiode;
a transfer transistor coupled between the photodiode and the floating diffusion, wherein the transfer transistor is configured to transfer the image charge from the photodiode to the floating diffusion;
a reset transistor coupled between a reset voltage and the floating diffusion; and
a plurality of capacitor-switch pairs, wherein each of the plurality of capacitor-switch pairs is coupled to one another in parallel between the reset transistor and a bias voltage source, and wherein each of the plurality of capacitor-switch pairs comprises:
a lateral overflow integration capacitor (LOFIC); and
a switch transistor coupled in series between the reset transistor and the LOFIC.

2. The pixel circuit of claim 1, wherein the switch transistor of a first of the plurality of capacitor-switch pairs is configured to be on and simultaneously switch transistors of remaining capacitor-switch pairs of the plurality of capacitor-switch pairs are configured to be off and to be discharging residual image charges during a first frame period.

3. The pixel circuit of claim 2, wherein the switch transistor of a second of the plurality of capacitor-switch pairs is configured to be on and simultaneously switch transistors of remaining capacitor-switch pairs of the plurality of capacitor-switch pairs are configured to be off and to be discharging residual image charges during a second frame period.

4. The pixel circuit of claim 1, wherein the plurality of capacitor-switch pairs comprises three capacitor-switch pairs.

5. The pixel circuit of claim 1, wherein the floating diffusion is a first floating diffusion, and wherein the pixel circuit further comprises:
a second floating diffusion coupled between the first floating diffusion and the reset transistor;
a dual floating diffusion (DFD) transistor coupled between the first floating diffusion and the second floating diffusion;
a third floating diffusion coupled between the second floating diffusion and the reset transistor; and
a LOFIC transistor coupled between the second floating diffusion and the third floating diffusion,
wherein the plurality of capacitor-switch pairs is coupled between the third floating diffusion and the bias voltage source.

6. The pixel circuit of claim 1, wherein the pixel circuit is included on a single wafer, and wherein the capacitors of the plurality of capacitor-switch pairs are included in an inter-metal dielectric (IMD) layer disposed proximate to a semiconductor substrate of the single wafer within a region of the pixel circuit.

7. The pixel circuit of claim 1, wherein the photodiode, the floating diffusion, the transfer transistor, and the reset transistor are included on a first wafer, and wherein each of the capacitors of the plurality of capacitor-switch pairs is included on a second wafer stacked with and coupled to the first wafer.

8. The pixel circuit of claim 1, wherein the LOFIC of a first of the plurality of capacitor-switch pairs and the LOFIC of a second of the plurality of capacitor-switch pairs are the same in at least one of dimensions, dielectric composition, and dielectric thickness.

9. The pixel circuit of claim 1, wherein the photodiode is a first photodiode, wherein the transfer transistor is a first transfer transistor, and wherein the pixel circuit further comprises:
a second photodiode configured to photogenerate image charge in response to incident light; and
a second transfer transistor coupled between the second photodiode and the floating diffusion, wherein the second transfer transistor is configured to transfer the image charge from the second photodiode to the floating diffusion.

10. The pixel circuit of claim 9, wherein the floating diffusion is a first floating diffusion, and wherein the pixel circuit further comprises:
a second floating diffusion coupled between the first floating diffusion and the reset transistor;
a dual floating diffusion (DFD) transistor coupled between the first floating diffusion and the second floating diffusion;
a third floating diffusion; and
a LOFIC transistor coupled between the second floating diffusion and the third floating diffusion,
wherein the second transfer transistor is coupled between the second floating diffusion and the second photodiode, and
wherein the plurality of capacitor-switch pairs is coupled between the third floating diffusion and the bias voltage source.

11. The pixel circuit of claim 9, wherein the pixel circuit is included on a single wafer.

12. The pixel circuit of claim 11, wherein the capacitors of the plurality of capacitor-switch pairs are included in an inter-metal dielectric (IMD) layer disposed proximate to a semiconductor substrate of the single wafer.

13. The pixel circuit of claim 12, wherein the semiconductor substrate overlaps with a photodiode region associated with the first photodiode, and wherein a photo-sensing area of the first photodiode is larger than a photo-sensing area of the second photodiode.

14. The pixel circuit of claim 9, wherein the first photodiode, the second photodiode, the floating diffusion, the first transfer transistor, the second transfer transistor, and the reset transistor are included on a first wafer, and wherein each of the capacitors of the plurality of capacitor-switch pairs is included on a second wafer stacked with and coupled to the first wafer.

15. The pixel circuit of claim 9, wherein the switch transistor of a first of the plurality of capacitor-switch pairs is configured to be on and simultaneously switch transistors of remaining capacitor-switch pairs of the plurality of capacitor-switch pairs are configured to be off and to be discharging residual image charges during a first frame period.

16. The pixel circuit of claim 15, wherein the switch transistor of a second of the plurality of capacitor-switch pairs is configured to be on and simultaneously switch transistors of remaining capacitor-switch pairs of the plurality of capacitor-switch pairs are configured to be off and to be discharging residual image charges during a second frame period.

17. The pixel circuit of claim 9, wherein the plurality of capacitor-switch pairs comprises three capacitor-switch pairs.

18. The pixel circuit of claim 9, wherein the LOFIC of a first of the plurality of capacitor-switch pairs and the LOFIC of a second of the plurality of capacitor-switch pairs are the same in at least one of dimensions, dielectric composition, and dielectric thickness.

19. A pixel circuit, comprising:
a photodiode configured to photogenerate image charge in response to incident light;
a first floating diffusion coupled to receive the image charge from the photodiode;
a transfer transistor coupled between the photodiode and the first floating diffusion, wherein the transfer transistor is configured to transfer the image charge from the photodiode to the first floating diffusion;
a reset transistor coupled between a reset voltage and the first floating diffusion;
a second floating diffusion different from the first floating diffusion and coupled between the first floating diffusion and the reset transistor;
a dual floating diffusion (DFD) transistor coupled between the first floating diffusion and the second floating diffusion;
a third floating diffusion coupled between the second floating diffusion and the reset transistor;
a lateral overflow integration capacitor (LOFIC) transistor coupled between the second floating diffusion and the third floating diffusion; and
a plurality of capacitor-switch pairs coupled between the third floating diffusion and a bias voltage source, wherein each of the plurality of capacitor-switch pairs includes—
a LOFIC, and
a switch transistor coupled in series between the third floating diffusion and the LOFIC.

20. A pixel circuit, comprising:
a photodiode configured to photogenerate image charge in response to incident light;
a first floating diffusion coupled to receive the image charge from the photodiode;
a transfer transistor coupled between the photodiode and the first floating diffusion, wherein the transfer transistor is configured to transfer the image charge from the photodiode to the first floating diffusion;
a reset transistor coupled between a reset voltage and the first floating diffusion;
a second floating diffusion different from the first floating diffusion and coupled between the first floating diffusion and the reset transistor;
a dual floating diffusion (DFD) transistor coupled between the first floating diffusion and the second floating diffusion; and
a plurality of capacitor-switch pairs coupled between the second floating diffusion and a bias voltage source, wherein each of the plurality of capacitor-switch pairs includes—
a LOFIC, and
a switch transistor coupled in series between the second floating diffusion and the LOFIC.

* * * * *